(12) United States Patent
Shin et al.

(10) Patent No.: US 9,755,544 B2
(45) Date of Patent: Sep. 5, 2017

(54) POWER CONVERSION DEVICE

(71) Applicant: NISSAN MOTOR CO., LTD., Yokohama-shi, Kanagawa (JP)

(72) Inventors: Kentarou Shin, Yokohama (JP); Kraisorn Throngnumchai, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 664 days.

(21) Appl. No.: 14/357,939

(22) PCT Filed: Oct. 19, 2012

(86) PCT No.: PCT/JP2012/077104
§ 371 (c)(1),
(2) Date: May 13, 2014

(87) PCT Pub. No.: WO2013/080698
PCT Pub. Date: Jun. 6, 2013

(65) Prior Publication Data
US 2014/0286070 A1    Sep. 25, 2014

(30) Foreign Application Priority Data
Nov. 28, 2011   (JP) ................................. 2011-258589

(51) Int. Cl.
*H02M 1/44* (2007.01)
*H02M 7/48* (2007.01)
*H02M 7/00* (2006.01)

(52) U.S. Cl.
CPC ............... *H02M 7/48* (2013.01); *H02M 1/44* (2013.01); *H02M 7/003* (2013.01)

(58) Field of Classification Search
CPC .......... H02M 1/44; H02M 7/003; H02M 7/42; H02M 7/44; H02M 7/46; H02M 7/48
USPC ........................................................ 363/131
See application file for complete search history.

(56) References Cited

U.S. PATENT DOCUMENTS 4,872,102 A * 10/1989 Getter .................... H05K 7/209
307/150
5,671,134 A * 9/1997 Nomura ................ H02M 7/003
363/132
2008/0130223 A1   6/2008 Nakamura et al.

FOREIGN PATENT DOCUMENTS

| JP | 9-037593 A | 2/1997 |
| JP | 2004-088936 A | 3/2004 |
| JP | 2005-236108 A | 9/2005 |
| JP | 2008-043023 A | 2/2008 |
| JP | 2010-197093 A | 9/2010 |
| JP | 2011-200074 A | 10/2011 |

\* cited by examiner

*Primary Examiner* — Levi Gannon
(74) *Attorney, Agent, or Firm* — Foley & Lardner LLP

(57) ABSTRACT

A power conversion device (1) of the present invention includes a power module (4) for converting direct current electricity to alternating current electricity, first and second power supply buses (5, 6) connecting input terminals (12, 13) and the power module (4), and a metal casing (7) for housing the first and second power supply buses (5, 6) and the power module (4). The capacitive coupling between the first power supply bus (5) and the metal casing (7) and the capacitive coupling between the second power supply bus (6) and the metal casing (7) are substantially matched. Thus, radiation noise is reduced by reducing the propagation of switching noise to the metal casing.

17 Claims, 14 Drawing Sheets (a)          (b)

POWER CONVERSION DEVICE

TECHNICAL FIELD

The present invention relates to a power conversion device for driving a vehicle's electric motor or the like, and particularly to a power conversion device for reducing switching noise.

BACKGROUND ART

In an electric vehicle, a so-called automotive power electronics system for obtaining mechanical energy from electric energy primarily includes a battery for supplying a direct current power supply, a power conversion device for converting direct current to alternating current, such as an inverter, and a motor for obtaining a turning force from an electrical output of the power conversion device.

The motor obtains a turning force from alternating current electricity outputted from the power conversion device by electromagnetic effects.

The power conversion device is connected to the battery through shielded cables. A casing of the power conversion device contains a switch group (power module), including modularized power semiconductor elements, and a capacitor. Here, in the power conversion device, plate-shaped conductors (bus bars) are provided to connect the power module and the shielded cables extending from the battery, and the capacitor is a smoothing capacitor which absorbs fluctuations in input voltage to the power conversion device. This smoothing capacitor is connected to power supply buses connecting the battery and the power conversion device, and partly reduces voltage fluctuations generated by switching. Moreover, the casing of the power conversion device contains a control circuit which controls the rotation of the motor by opening or closing the switch group including power semiconductor elements.

The power conversion device having the above-described configuration opens or closes the switch group according to a signal from the control circuit, thus converting direct current electricity of the battery to generate alternating current electricity for obtaining the turning force of the motor.

In a power conversion device such as described above, when switches disposed therein are opened or closed, switching noise is generated. When it is assumed that the power conversion device is mounted on, for example, a vehicle, this switching noise affects listening to a mobile radio mounted on the vehicle, e.g., makes it difficult to listen to the radio or generates grating noise. In some cases, there is concern that this switching noise may also inversely affect the operations of other digital instruments mounted on the vehicle.

Accordingly, as a conventional technique for reducing a surge voltage generated by switching, Patent Literature 1 has been disclosed. In this Patent Literature 1, in a semiconductor device to be used in a power conversion device, an electrode connected to a positive side of a power supply and an electrode connected to a negative side of the power supply are disposed parallel, and configured such that currents flow through the electrodes in opposite directions, respectively. Thus, magnetic fluxes generated by the currents cancel out each other, and inductance is reduced. Accordingly, the surge voltage generated by switching is reduced.

CITATION LIST

Patent Literature

PATENT LITERATURE 1: Japanese Patent Application Publication No. 2005-236108

SUMMARY OF INVENTION

However, in the above-described conventional semiconductor device, in the case where the semiconductor device is housed in a metal casing, the capacitive coupling between the positive-side electrode and the metal casing is different from the capacitive coupling between the negative-side electrode and the metal casing. Accordingly, there has been a problem that switching noise generated in the positive-side electrode and the negative-side electrode propagates to the metal casing to become a cause of, for example, radio noise or the like.

The frequency of such noise propagating from the electrode to the metal casing is determined by electric characteristics including electrode dimensions. For example, when lengths of sides of each plate-shaped electrode are denoted by a and b, and the dielectric constant between the plates is denoted by $\in r$, the frequency can be expressed by the following formula (1):

[Formula 1]

$$f_{mn} = \frac{c}{2\pi\sqrt{\varepsilon_r}} \sqrt{\left(\frac{m\pi}{a}\right)^2 + \left(\frac{n\pi}{b}\right)^2} \quad (1)$$

For example, assuming that a=0.3 m, b=0.03 m, and $\in r$=6.25 in formula (1), $f_{10}$=200 MHz is obtained for (m, n)=(1, 0). In this case, when conditions such as metal casing and electrodes dimensions and dielectric constant are satisfied, switching in the power module causes high-frequency vibrations in electrode portions, and the electrodes excite the surface of the metal casing. As a result, radiation noise emanates from the surface of the metal casing.

Accordingly, the present invention has been proposed in view of the above-described circumstances, and an object of the present invention is to provide a power conversion device which can reduce radiation noise by reducing the propagation of switching noise to a metal casing.

The present invention includes a power module for converting direct current electricity to alternating current electricity, first and second power supply buses connecting input terminals and the power module, and a metal casing for housing the first and second power supply buses and the power module. The present invention solves the aforementioned problem by substantially matching a capacitive coupling between the first power supply bus and the metal casing and a capacitive coupling between the second power supply bus and the metal casing.

DESCRIPTION OF EMBODIMENTS

Hereinafter, first to eighth embodiments to which the present invention is applied will be described with reference to the drawings.

[First Embodiment]

Figure 1:
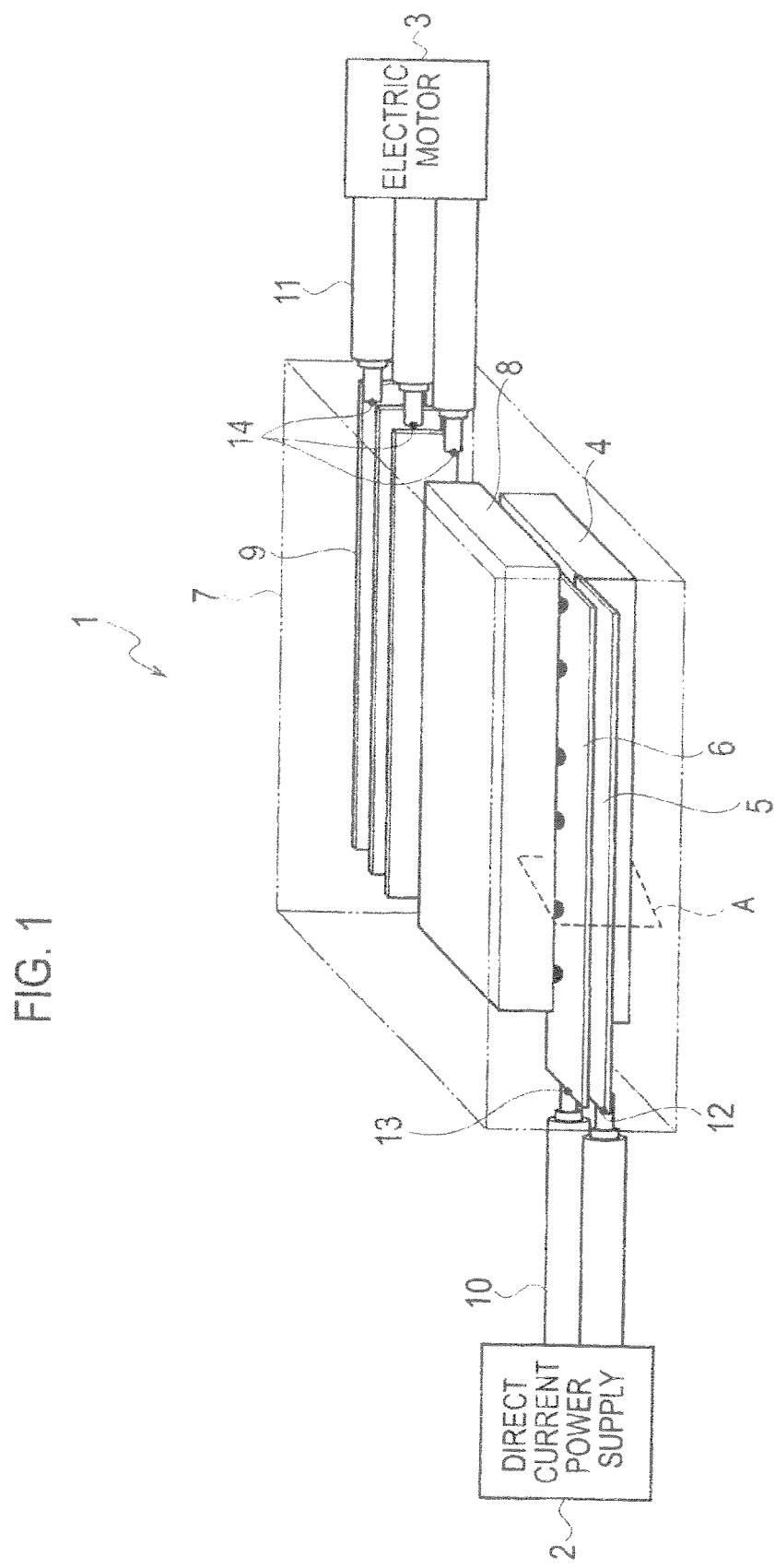
FIG. 1 is a three-dimensional perspective view showing the structure of a power conversion device according to a first embodiment to which the present invention is applied.
Figure 2:
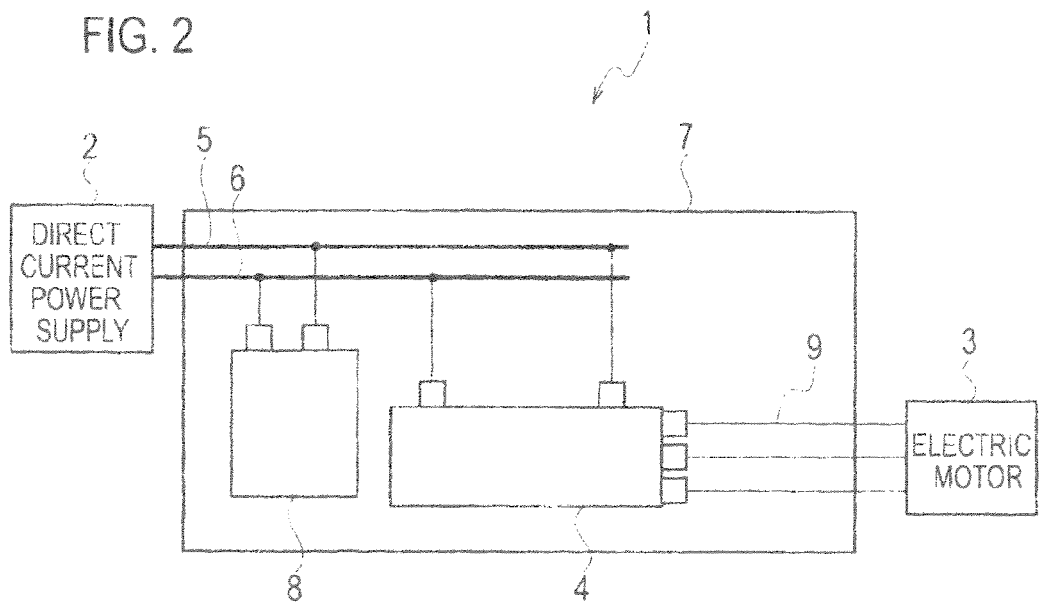
FIG. 2 is a plan view showing the structure of the power conversion device according to the first embodiment to which the present invention is applied.
Figure 3:
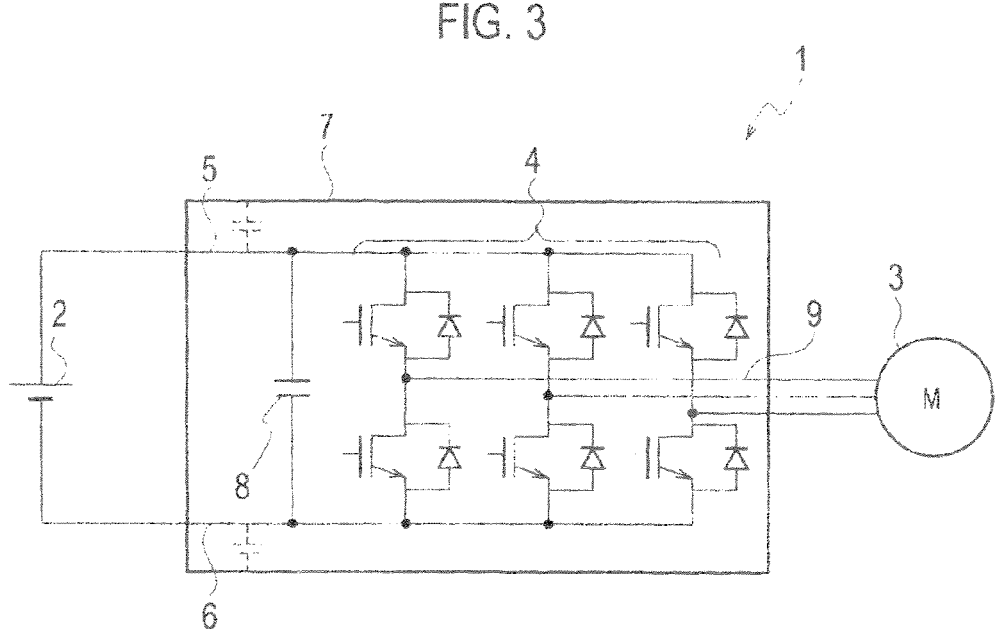
FIG. 3 is a circuit diagram showing the circuit configuration of the power conversion device according to the first embodiment to which the present invention is applied.

FIG. 1 is a three-dimensional perspective view showing the structure of a power conversion device according to this embodiment, FIG. 2 is a plan view thereof, and FIG. 3 is a circuit diagram thereof.

As shown in FIGS. 1 to 3, a power conversion device 1 according to this embodiment includes a power module 4 for converting direct current electricity supplied from a direct current power supply 2 to alternating current electricity and driving an electric motor 3, a first power supply bus 5 connecting a positive side of the direct current power supply 2 and the power module 4, a second power supply bus 6 connecting a negative side of the direct current power supply 2 and the power module 4, a metal casing 7 for housing the power conversion device 1, a smoothing capacitor 8 for smoothing the direct current electricity supplied from the direct current power supply 2, bus bars 9 connected to the power module 4 and respectively connected to phases U, V, and W of the electric motor 3, shielded cables 10 connecting the direct current power supply 2 to the first and second power supply buses 5 and 6, and shielded cables 11 connecting the bus bars 9 to the electric motor 3. Moreover, the first power supply bus 5 is connected to the shielded cable 10 through a first input terminal 12 to be connected to a positive electrode of the direct current power supply 2. Similarly, the second power supply bus 6 is connected to the shielded cable 10 through a second input terminal 13 to be connected to a negative electrode of the direct current power supply 2. Further, the bus bars 9 are connected to the shielded cables 11 through output terminals 14.

Here, the power conversion device 1 according to this embodiment is connected between the direct current power supply 2 and the electric motor 3, and converts the direct current electricity supplied from the direct current power supply 2 to alternating current electricity to supply the alternating current electricity to the electric motor 3. In this embodiment, an explanation is made by taking an electric vehicle as an example. However, the present invention can be applied to a hybrid car, and can also be applied to a power conversion device mounted on an apparatus other than a vehicle.

The direct current power supply 2 is, for example, a battery mounted on a vehicle, or the like. The direct current power supply 2 includes plural cells, and is connected to the first and second power supply buses 5 and 6 through the shielded cables 10.

The electric motor 3 is, for example, a three-phase AC motor mounted on an electric vehicle, or the like. The phases U, V, and W of the electric motor 3 are connected to the bus bars 9 through the shielded cables 11, respectively.

The power module 4 is power conversion means for converting direct current electricity to alternating current electricity, and includes plural switching elements for performing power conversion from direct current to three-phase alternating current and plural freewheeling diodes for performing power conversion from three-phase alternating current to direct current as shown in FIG. 3.

The first power supply bus 5 is power supply means connecting the first input terminal 12 and the power module 4. The first power supply bus 5 is made of a plate-shaped (flat plate) electrically conductive member, and is a power supply line for supplying electricity outputted from the positive side of the direct current power supply 2 to the power module 4. In particular, the first power supply bus 5 corresponds to a P-side power supply line of an inverter circuit constituting the power conversion device 1.

The second power supply bus 6 is power supply means connecting the second input terminal 13 and the power module 4. The second power supply bus 6 is made of a plate-shaped (flat plate) electrically conductive member having the same structure as the first power supply bus 5, and is a power supply line for supplying electricity outputted from the negative side of the direct current power supply 2 to the power module 4. In particular, the second power supply bus 6 corresponds to an N-side power supply line of the inverter circuit constituting the power conversion device 1.

The metal casing 7 is a metal housing case (housing means) for housing the entire power conversion device 1, particularly housing the first and second power supply buses 5 and 6 and the power module 4, and contains a control circuit and a driving circuit, which are not illustrated, other than components shown in FIGS. 1 to 3.

The smoothing capacitor 8 is a capacitor for reducing and smoothing voltage fluctuations in direct current electricity to be supplied to the power module 4.

The bus bars 9 are three plate-shaped conductive materials, and are connected to the phases U, V, and W of the electric motor 3 through the shielded cables 11, respectively.

The shielded cables 10 are cables formed by covering metal wires with resin, and include a pair of shielded cables. One of the shielded cables connects a positive electrode terminal of the direct current power supply 2 and the first power supply bus 5, and the other shielded cable connects a negative electrode terminal of the direct current power supply 2 and the second power supply bus 6.

The shielded cables 11 include three shielded cables, corresponding to the phases U, V, and W of the electric motor 3, respectively, and connect the bus bars 9 to the electric motor 3.

Next, a cross-sectional structure of a portion indicated by A in FIG. 1 will be described with reference to FIG. 4.

Figure 4:
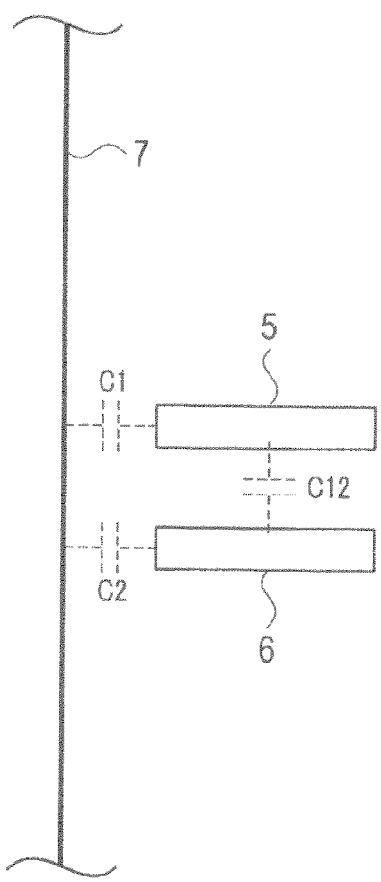
FIG. 4 is a view showing a cross-sectional structure of the power conversion device according to the first embodiment to which the present invention is applied.

As shown in FIG. 4, the first power supply bus 5 and the second power supply bus 6 are disposed such that the respective distances from the first power supply bus 5 and the second power supply bus 6 to the metal casing 7 match or substantially match. By adjusting the relationship between the distance between the first power supply bus 5 and the metal casing 7 and the distance between the second power supply bus 6 and the metal casing 7 in this way, the capacitive coupling C1 between the first power supply bus 5 and the metal casing 7 can be matched with or substantially matched with the capacitive coupling C2 between the second power supply bus 6 and the metal casing 7. Further, as shown in FIG. 4, the first power supply bus 5 and the second power supply bus 6 are disposed such that large-area flat surfaces thereof face each other, and small-area flat surfaces thereof face the metal casing 7.

Here, the capacitive coupling between each of the power supply buses 5 and 6 and the metal casing 7, which is denoted by C, can be expressed by the following formula (2):

[Formula 2]

$$C = \varepsilon_0 \varepsilon_r \frac{S}{d} \qquad (2)$$

$\varepsilon_0$: vacuum dielectric constant
$\varepsilon_r$: relative dielectric constant
S: area of facing
d: distance Moreover, in the case where the power supply buses 5 and 6 are plate-shaped conductive materials, the inductance component L of each of the power supply buses 5 and 6 and the mutual inductance component M (hereinafter referred to as an inductive coupling) of two facing conductive materials can be expressed by the following formulas (3):

[Formula 3]

$$L \approx \frac{\mu l}{2\pi}\left[\ln\left(\frac{2l}{w+H}\right) + \frac{1}{2} + \frac{0.2235(w+H)}{l}\right] \qquad (3)$$

$$M \approx \frac{\mu l}{2\pi}\left[\ln\left(\frac{2l}{d}\right) - 1 + \frac{d}{l}\right]$$

H: thickness of plate-shaped conductive material
w: width of plate-shaped conductive material
d: distance between first and second power supply buses
l: length of plate-shaped conductive material
μ: magnetic permeability Further, electric characteristics between the first power supply bus 5 and the metal casing 7 and electric characteristics between the second power supply bus 6 and the metal casing 7 can be expressed by the following formulas (4) and (4'), where a and b represent the power supply bus and the metal casing, respectively.

[Formula 4]

$$Z_{ab} \approx \sqrt{\frac{L_{ab}}{C_{ab}}} \qquad (4)$$

$$Z_{ab} \approx \sqrt{\frac{L_{ab} \cdot d}{\varepsilon_0 \varepsilon_r S}} \qquad (4')$$

Accordingly, when the first power supply bus 5 and the second power supply bus 6 having equivalent cross-sectional shapes are disposed such that the distances to the metal casing 7 substantially match as shown in FIG. 4, the capacitive couplings C1 and C2 become equal, and electric characteristics also become equal.

Here, the propagation of switching noise generated in the power supply buses 5 and 6 to the metal casing 7 will be described.

Figure 5:
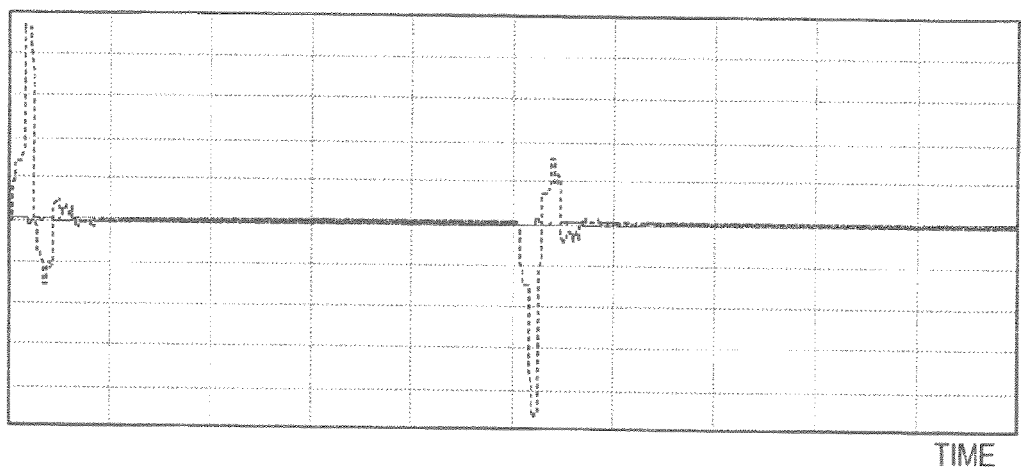
FIG. 5 is a graph showing noise propagated to a metal casing, the noise being part of switching noise generated in a first power supply bus and a second power supply bus of the power conversion device according to the first embodiment to which the present invention is applied.

FIG. 5 is a graph showing noise propagated to the metal casing 7, the noise being part of switching noise generated in the first power supply bus 5 and the second power supply bus 6 by switching inside the power module 4. A solid line is a noise waveform for the case where electric characteristics between the first power supply bus 5 and the metal casing 7 are equivalent to electric characteristics between the second power supply bus 6 and the metal casing 7; and a dotted line is a noise waveform for the case where electric characteristics between the first power supply bus 5 and the metal casing 7 are not equivalent to electric characteristics between the second power supply bus 6 and the metal casing 7.

Figure 6:
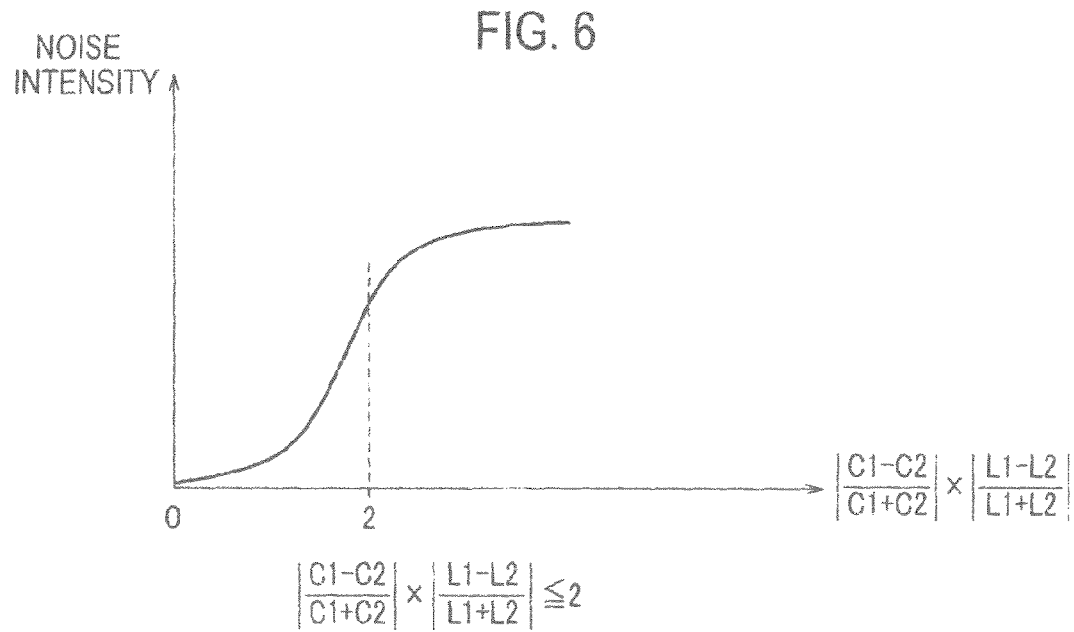
FIG. 6 is a graph showing the relationship between noise intensity and electric characteristics balance in the power conversion device according to the first embodiment to which the present invention is applied.

Further, FIG. 6 shows the relationship between noise intensity obtained by integrating the mean of the square of the waveform in FIG. 5 and electric characteristics balance $CL_{BAL}$. The electric characteristics balance $CL_{BAL}$ is expressed by formula (5):

[Formula 5]

$$CL_{BAL} = \left|\frac{C1-C2}{C1+C2}\right| \times \left|\frac{L1-L2}{L1+L2}\right| \qquad (5)$$

As can be seen from FIG. 6, the noise intensity decreases with decreasing electric characteristics balance $CL_{BAL}$. Moreover, it can be seen from FIG. 6 that the noise intensity can be reduced by at least setting the electric characteristics balance $CL_{BAL}$ to 2 or less. In other words, it is indicated that the noise intensity becomes low when electric characteristics between the first power supply bus 5 and the metal casing 7 are equivalent to electric characteristics between the second power supply bus 6 and the metal casing 7, and the noise intensity becomes low when both of the capacitive coupling difference (C1-C2) and the inductive coupling difference (L1 L2 ) are small. That is to say, switching surge can be reduced, and the propagation of noise to the metal casing 7 can be reduced.

In particular, in this embodiment, since the capacitive coupling C1 of the first power supply bus 5 and the capacitive coupling C2 of the second power supply bus 6 are substantially matched such that the capacitive coupling difference (C1-C2) becomes approximately zero, the noise intensity can be reliably reduced.

It should be noted that though a description has been made for the case where the electric characteristics balance $CL_{BAL}$ is set to 2 or less, the noise intensity can also be reduced by setting any one of |C1−C2/C1+C2| and |L1−L2/L1+L2 | to 2 or less.

Figure 7:
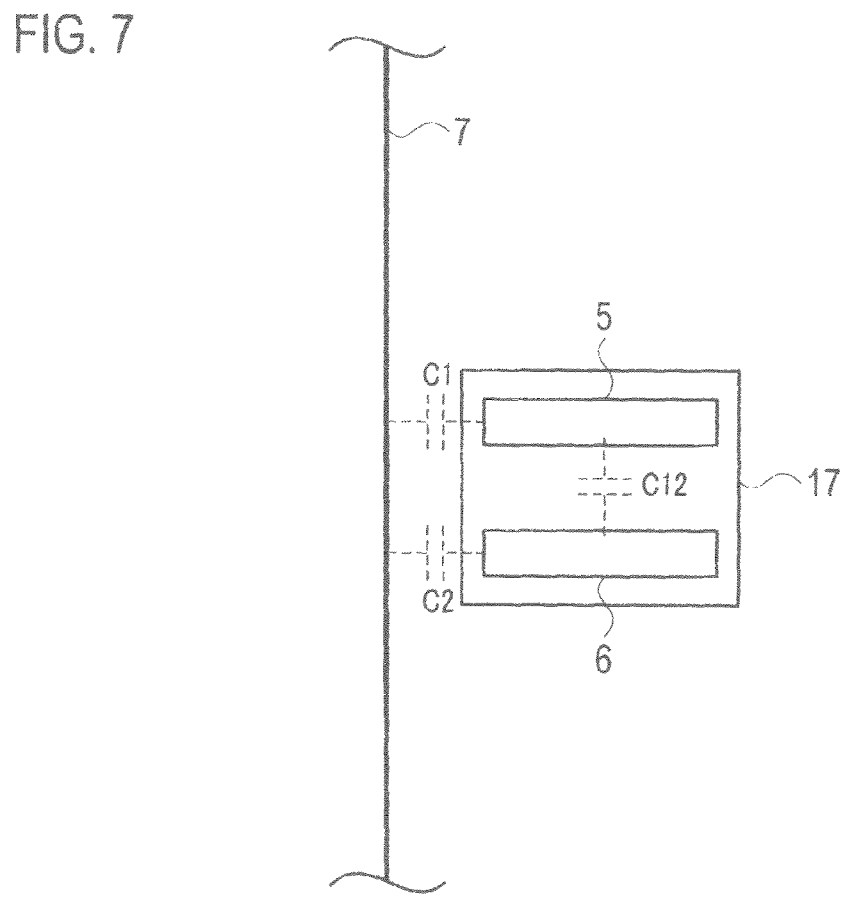
FIG. 7 is a view showing a cross-sectional structure of the power conversion device according to the first embodiment to which the present invention is applied.

Moreover, as shown in FIG. 7, the first power supply bus 5 and the second power supply bus 6 may be integrally molded with resin 17. This facilitates fixing the first power supply bus 5 and the second power supply bus 6 to each other.

[Effects of First Embodiment]

As described above in detail, in the power conversion device according to this embodiment, the capacitive coupling C1 between the first power supply bus 5 and the metal casing 7 and the capacitive coupling C2 between the second power supply bus 6 and the metal casing 7 are substantially matched. Accordingly, radiation noise can be reduced by reducing the propagation of switching noise to the metal casing 7.

Further, in the power conversion device according to this embodiment, the capacitive coupling C1 between the first power supply bus 5 and the metal casing 7 and the capacitive coupling C2 between the second power supply bus 6 and the metal casing 7 are substantially matched by adjusting the relationship between the distance between the first power supply bus 5 and the metal casing 7 and the distance between the second power supply bus 6 and the metal casing 7. Accordingly, radiation noise can be reduced by reducing the propagation of switching noise to the metal casing 7.

Moreover, in the power conversion device according to this embodiment, the first power supply bus 5 and the second power supply bus 6 are formed of plate-shaped electrically conductive members, and the first power supply bus 5 and the second power supply bus 6 are disposed such that large-area flat surfaces thereof face each other. Accordingly, the inductive coupling between the first power supply bus 5 and the second power supply bus 6 becomes small, and switching noise generated in the first power supply bus 5 and the second power supply bus 6 can be reduced.

Furthermore, in the power conversion device according to this embodiment, the first power supply bus 5 and the second power supply bus 6 are disposed such that small-area flat surfaces thereof face the metal casing 7. Accordingly, the capacitive coupling between each of the first power supply bus 5 and the second power supply bus 6 and the metal casing 7 becomes small, and the propagation of switching noise generated in the first power supply bus 5 and the second power supply bus 6 to the metal casing 7 can be reduced.

Moreover, in the power conversion device according to this embodiment, the first power supply bus 5 and the second power supply bus 6 are molded with resin. Accordingly, the first power supply bus 5 and the second power supply bus 6 can be easily fixed to each other.

Further, in the power conversion device according to this embodiment, a capacitive coupling quotient obtained by dividing the difference between the capacitive coupling C1 and the capacitive coupling C2 by the sum of the capacitive coupling C1 and the capacitive coupling C2 is set to 2 or less. Accordingly, the propagation of switching noise generated in the first power supply bus 5 and the second power supply bus 6 to the metal casing 7 can be reduced.

Moreover, in the power conversion device according to this embodiment, an inductive coupling quotient obtained by dividing the difference between the inductive coupling L1 and the inductive coupling L2 by the sum of the inductive coupling L1 and the inductive coupling L2 is set to 2 or less. Accordingly, the propagation of switching noise generated in the first power supply bus 5 and the second power supply bus 6 to the metal casing 7 can be reduced.

Furthermore, in the power conversion device according to this embodiment, the product of the capacitive coupling quotient and the inductive coupling quotient is set to 2 or less. Accordingly, the propagation of switching noise generated in the first power supply bus 5 and the second power supply bus 6 to the metal casing 7 can be reduced.

[Second Embodiment]

Next, a second embodiment to which the present invention is applied will be described with reference to drawings. It should be noted that the same portions as in the above-described first embodiment will not be further described in detail.

Figure 8:
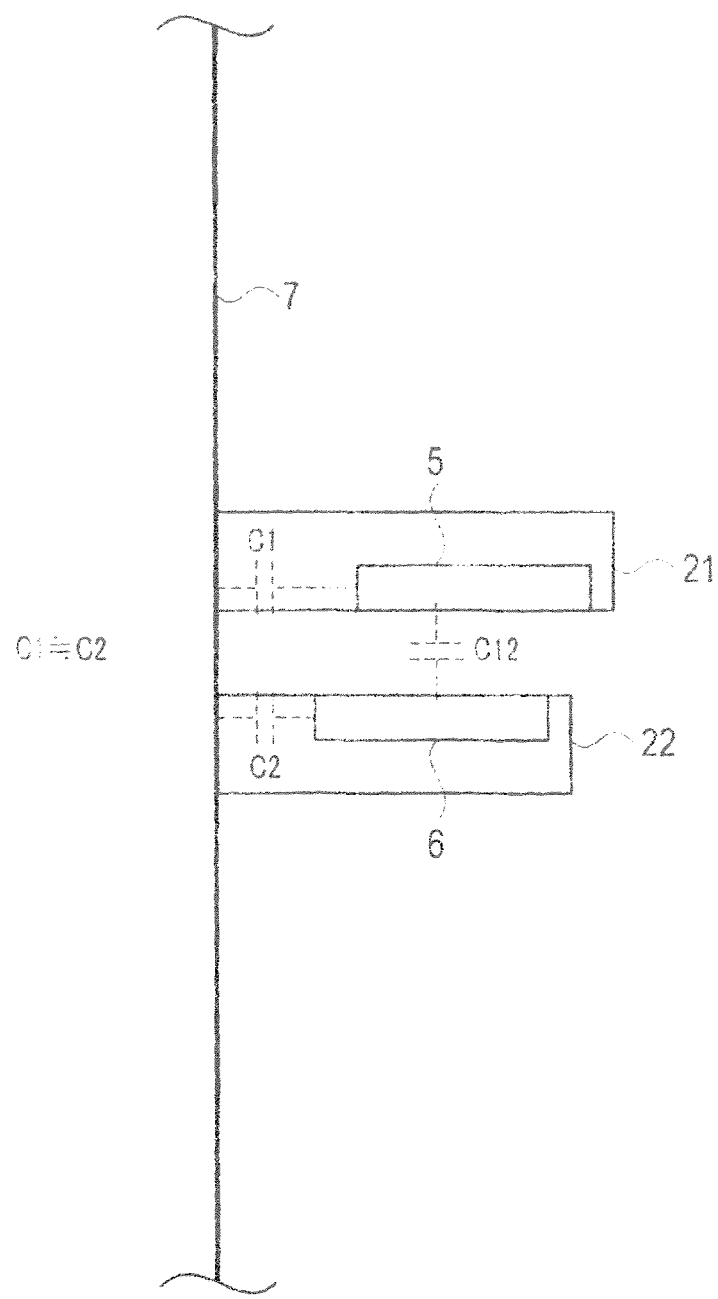
FIG. 8 is a view showing a cross-sectional structure of a power conversion device according to a second embodiment to which the present invention is applied.

FIG. 8 is a view showing a cross-sectional structure of the aforementioned portion indicated by A in FIG. 1. As shown in FIG. 8, a power conversion device according to this embodiment has the following feature: the capacitive coupling C1 between the first power supply bus 5 and the metal casing 7 and the capacitive coupling C2 between the second power supply bus 6 and the metal casing 7 are matched or substantially matched by adjusting the relationship between the dielectric constant between the first power supply bus 5 and the metal casing 7 and the dielectric constant between the second power supply bus 6 and the metal casing 7.

Specifically, a dielectric 21 or a magnetic body 22 is disposed in each of a space between the first power supply bus 5 and the metal casing 7 and a space between the second power supply bus 6 and the metal casing 7 so that the capacitive coupling C1 between the first power supply bus 5 and the metal casing 7 and the capacitive coupling C2 between the second power supply bus 6 and the metal casing 7 may be matched or substantially matched.

In FIG. 8, the case where the distance between the second power supply bus 6 and the metal casing 7 is shorter than the distance between the first power supply bus 5 and the metal casing 7 is shown as one example. In this case, a dielectric 21 is inserted between the first power supply bus 5 and the metal casing 7, and a magnetic body 22 is inserted between the second power supply bus 6 and the metal casing 7. Thus, electric characteristics between the first power supply bus 5 and the metal casing 7 and electric characteristics between the second power supply bus 6 and the metal casing 7 are adjusted to be equivalent to each other.

This can reduce the propagation of switching noise generated in the first power supply bus 5 and the second power supply bus 6 by switching inside the power module 4 to the metal casing 7.

It should be noted, however, that since it is enough to substantially match the capacitive coupling C1 and the capacitive coupling C2, the distance between the first power supply bus 5 and the metal casing 7 may be reduced. Moreover, a dielectric 21 or a magnetic body 22 may be inserted in any one of a space between the first power supply bus 5 and the metal casing 7 and a space between the second power supply bus 6 and the metal casing 7.

[Effects of Second Embodiment]

As described above in detail, in the power conversion device according to this embodiment, the capacitive coupling C1 between the first power supply bus 5 and the metal casing 7 and the capacitive coupling C2 between the second power supply bus 6 and the metal casing 7 are substantially matched. Accordingly, radiation noise can be reduced by reducing the propagation of switching noise to the metal casing 7.

Moreover, in the power conversion device according to this embodiment, the capacitive coupling C1 between the first power supply bus 5 and the metal casing 7 and the capacitive coupling C2 between the second power supply bus 6 and the metal casing 7 are substantially matched by adjusting the relationship between the dielectric constant between the first power supply bus 5 and the metal casing 7 and the dielectric constant between the second power supply bus 6 and the metal casing 7. Accordingly, radiation noise can be reduced by reducing the propagation of switching noise to the metal casing 7.

Further, in the power conversion device according to this embodiment, by disposing a dielectric or a magnetic body between the first power supply bus 5 and the metal casing 7 and/or between the second power supply bus 6 and the metal casing 7, the relationship between the dielectric constant between the first power supply bus 5 and the metal casing 7 and the dielectric constant between the second power supply bus 6 and the metal casing 7 is adjusted. This makes it possible to substantially match the capacitive coupling C1 between the first power supply bus 5 and the metal casing 7 and the capacitive coupling C2 between the second power supply bus 6 and the metal casing 7. Accordingly, radiation noise can be reduced by reducing the propagation of switching noise to the metal casing 7.

[Third Embodiment]

Next, a third embodiment to which the present invention is applied will be described with reference to drawings. It should be noted that the same portions as in the above-described first and second embodiments will not be further described in detail.

Figure 9:
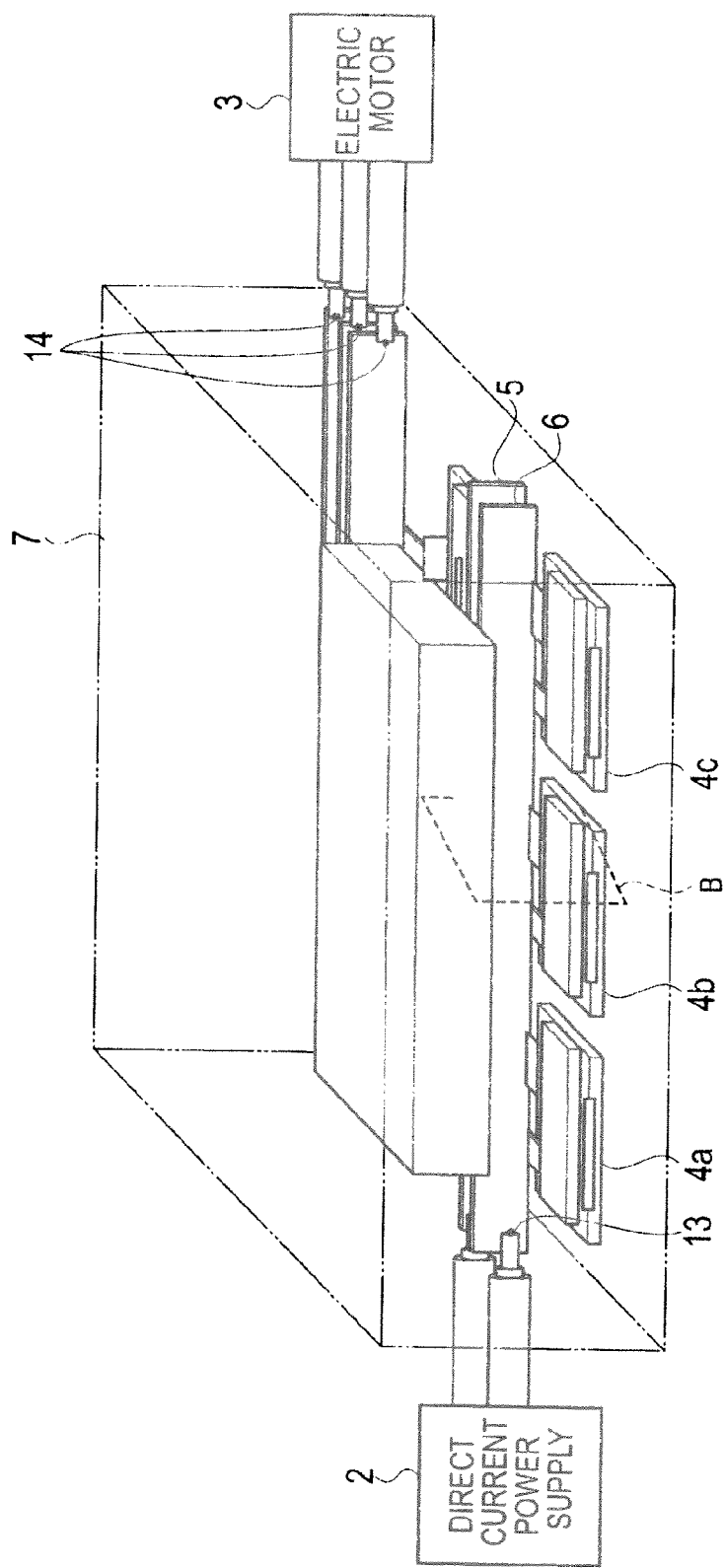
FIG. 9 is a three-dimensional perspective view showing the structure of a power conversion device according to a third embodiment to which the present invention is applied.
Figure 10:
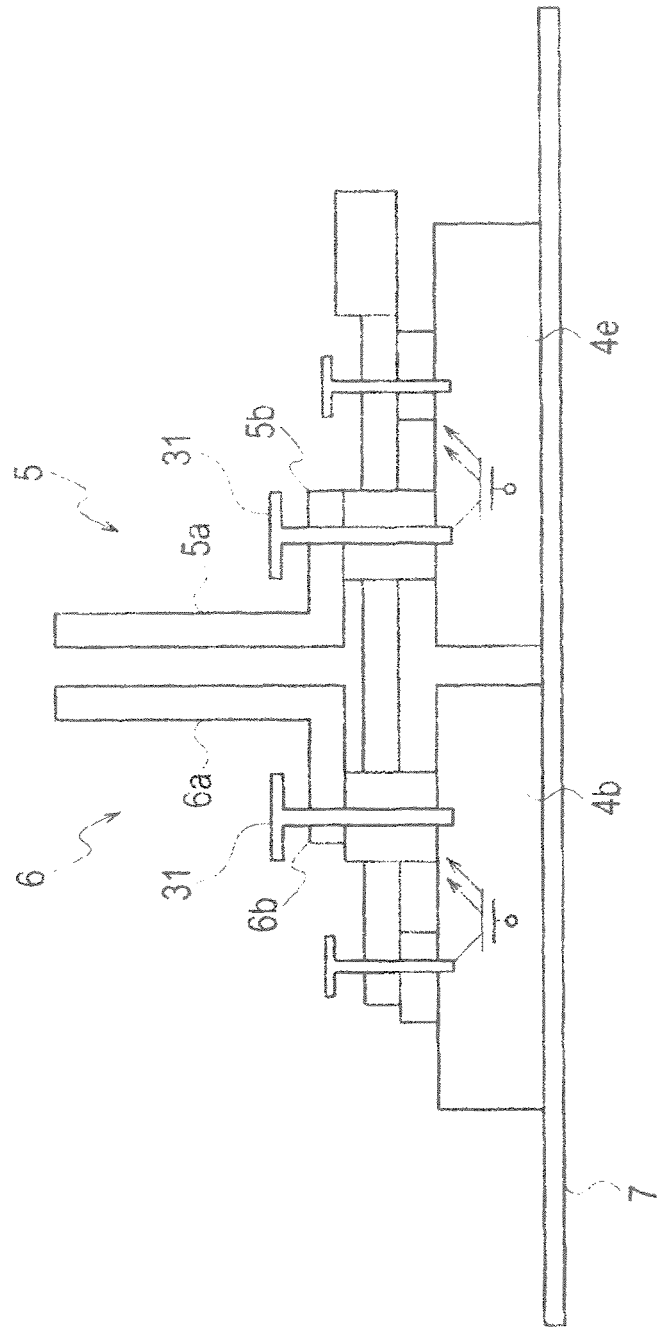
FIG. 10 is a view showing a cross-sectional structure of the power conversion device according to the third embodiment to which the present invention is applied.

FIG. 9 is a three-dimensional perspective view showing the structure of a power conversion device according to this embodiment, and FIG. 10 is a view showing a cross-sectional structure of a portion indicated by B in FIG. 9.

As shown in FIGS. 9 and 10, in the power conversion device according to this embodiment, a single power module in the first embodiment is divided into plural power modules 4a to 4f.

Moreover, the first power supply bus 5 and the second power supply bus 6 are formed of plate-shaped electrically conductive members, bent in the shape of the letter L, and disposed such that large-area flat surfaces 5a and 6a thereof face each other and that small-area flat surfaces 5b and 6b thereof face the metal casing 7. The first power supply bus 5 and the second power supply bus 6 are respectively connected through the small-area flat surfaces 5b and 6b to the power modules 4a-4f with a screw 31.

Since the first power supply bus 5 and the second power supply bus 6 are disposed such that the large-area flat surfaces thereof face each other as described above, the mutual inductance becomes small, and switching noise generated in the first power supply bus 5 and the second power supply bus 6 can be reduced. Moreover, since the surfaces of the plate-shaped electrically conductive members of the first power supply bus 5 and the second power supply bus 6 which face the metal casing 7 have small areas, the capacitive couplings C1 and C2 become small, and a structure can be obtained in which it is easy to make electric characteristics between the first power supply bus 5 and the metal casing 7 and electric characteristics between the second power supply bus 6 and the metal casing 7 equivalent to each other.

[Effects of Third Embodiment]

As described above in detail, in the power conversion device according to this embodiment, the first power supply bus 5 and the second power supply bus 6 are formed of plate-shaped electrically conductive members, and the first power supply bus 5 and the second power supply bus 6 are disposed such that large-area flat surfaces thereof face each other. Accordingly, the inductive coupling between the first power supply bus 5 and the second power supply bus 6 becomes small, and switching noise generated in the first power supply bus 5 and the second power supply bus 6 can be reduced.

Furthermore, in the power conversion device according to this embodiment, the first power supply bus 5 and the second power supply bus 6 are disposed such that small-area flat surfaces thereof face the metal casing 7. Accordingly, the capacitive coupling between each of the first power supply bus 5 and the second power supply bus 6 and the metal casing 7 becomes small, and the propagation of switching noise generated in the first power supply bus 5 and the second power supply bus 6 to the metal casing 7 can be reduced.

[Fourth Embodiment]

Next, a fourth embodiment to which the present invention is applied will be described with reference to drawings. It should be noted that the same portions as in the above-described first to third embodiments will not be further described in detail.

Figure 11:
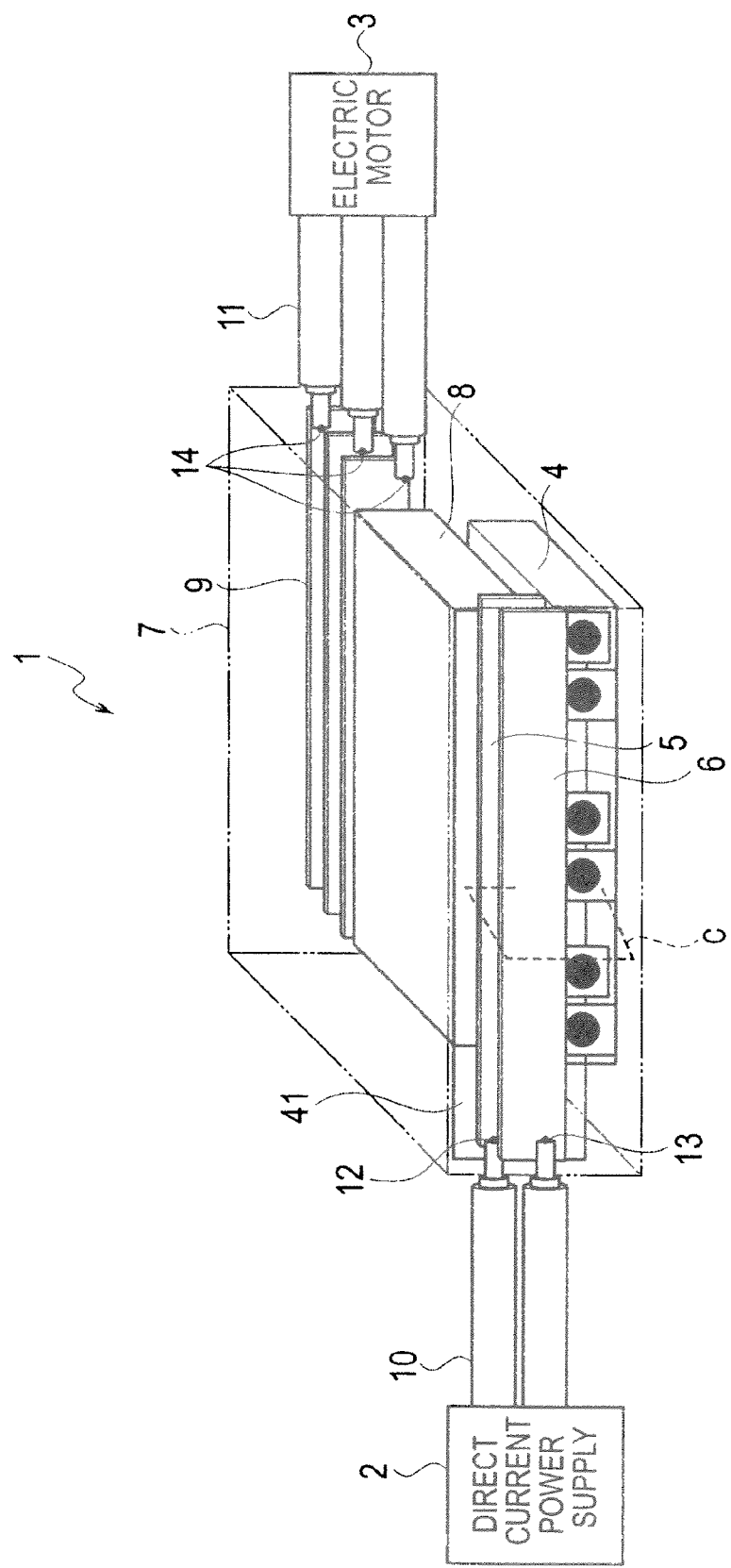
FIG. 11 is a three-dimensional perspective view showing the structure of a power conversion device according to a fourth embodiment to which the present invention is applied.
Figure 12:
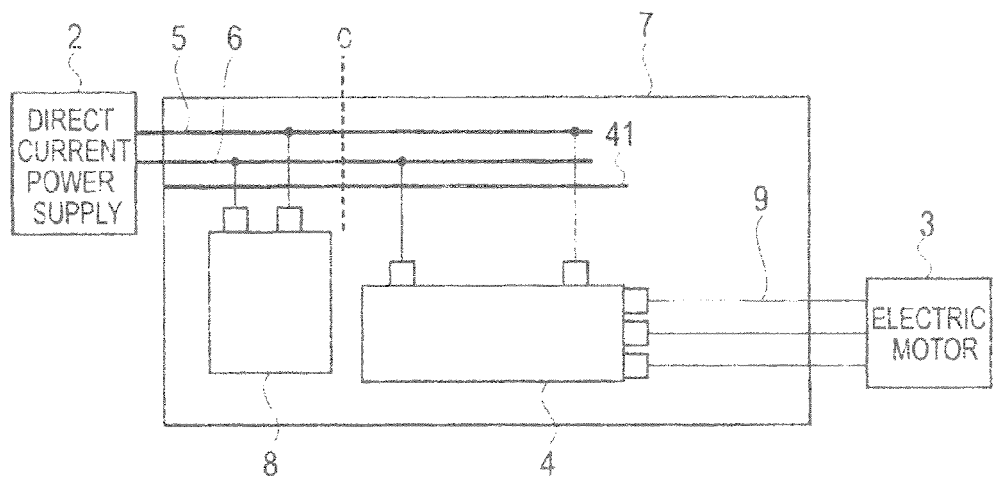
FIG. 12 is a plan view showing the structure of the power conversion device according to the fourth embodiment to which the present invention is applied.

FIG. 11 is a three-dimensional perspective view showing the structure of a power conversion device according to this embodiment, and FIG. 12 is a plan view. As shown in FIGS. 11 and 12, the power conversion device according to this embodiment has the following features: the power conversion device further includes a casing conducting member 41 electrically continuous with the metal casing 7; and the first power supply bus 5 and the second power supply bus 6 are disposed between the casing conducting member 41 and the metal casing 7.

Figure 13:
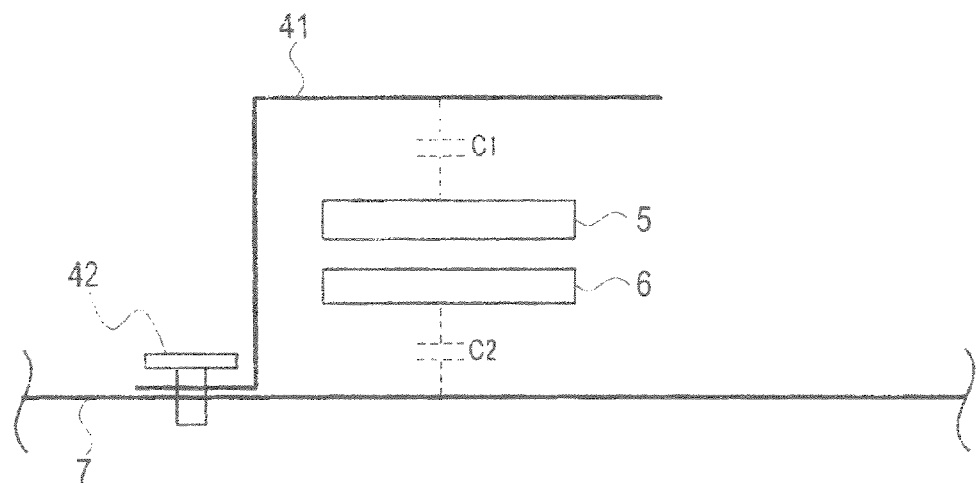
FIG. 13 is a view showing a cross-sectional structure of the power conversion device according to the fourth embodiment to which the present invention is applied.

Here, a cross-sectional structure of a portion indicated by C in FIG. 11 is shown in FIG. 13. As shown in FIG. 13, the casing conducting member 41 is connected to the metal casing 7 with a fastening member 42 such as a screw to be electrically continuous with the metal casing 7. It should be noted, however, that the connection may be made by die casting or the like without the use of the fastening member 42.

The first power supply bus 5 and the second power supply bus 6 are disposed between the casing conducting member 41 and the metal casing 7, and configured such that the capacitive coupling C1 between the first power supply bus 5 and the casing conducting member 41 and the capacitive coupling C2 between the second power supply bus 6 and the metal casing 7 match or substantially match. A way to substantially match the capacitive couplings C1 and C2 may be to substantially match the distances or to insert a magnetic body or a dielectric.

Since the first power supply bus 5 and the second power supply bus 6 are disposed between the casing conducting member 41 and the metal casing 7 as described above, electric characteristics between the first power supply bus 5 and the casing conducting member 41 and electric characteristics between the second power supply bus 6 and the metal casing 7 can be easily substantially matched.

Figure 14:
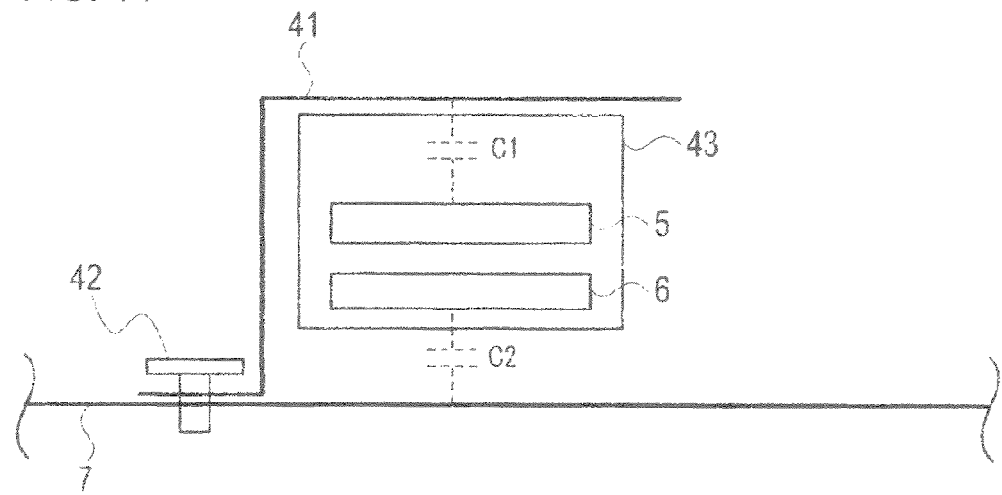
FIG. 14 is a view showing a cross-sectional structure of the power conversion device according to the fourth embodiment to which the present invention is applied.

Moreover, as shown in FIG. 14, the first power supply bus 5 and the second power supply bus 6 may be molded with resin 43 in order to facilitate fixing the first power supply bus 5 and the second power supply bus 6 to each other. In this case, by molding the metal casing 7 side and the casing conducting member 41 side with the resin 43 containing a dielectric to different thicknesses, respectively, the layer of the resin 43 is formed such that electric characteristics between the first power supply bus 5 and the casing conducting member 41 and electric characteristics between the second power supply bus 6 and the metal casing 7 substantially match. This can reduce the propagation of switching noise generated in the first and second power supply buses 5 and 6 to the metal casing 7.

[Effects of Fourth Embodiment]

As described above in detail, in the power conversion device according to this embodiment, the casing conducting member 41 electrically continuous with the metal casing 7 is additionally provided, and the first power supply bus 5 and the second power supply bus 6 are disposed between the casing conducting member 41 and the metal casing 7. Accordingly, electric characteristics between the first power supply bus 5 and the casing conducting member 41 and electric characteristics between the second power supply bus 6 and the metal casing 7 can be easily substantially matched.

[Fifth Embodiment]

Next, a fifth embodiment to which the present invention is applied will be described with reference to drawings. It should be noted that the same portions as in the above-described first to fourth embodiments will not be further described in detail.

Figure 15:
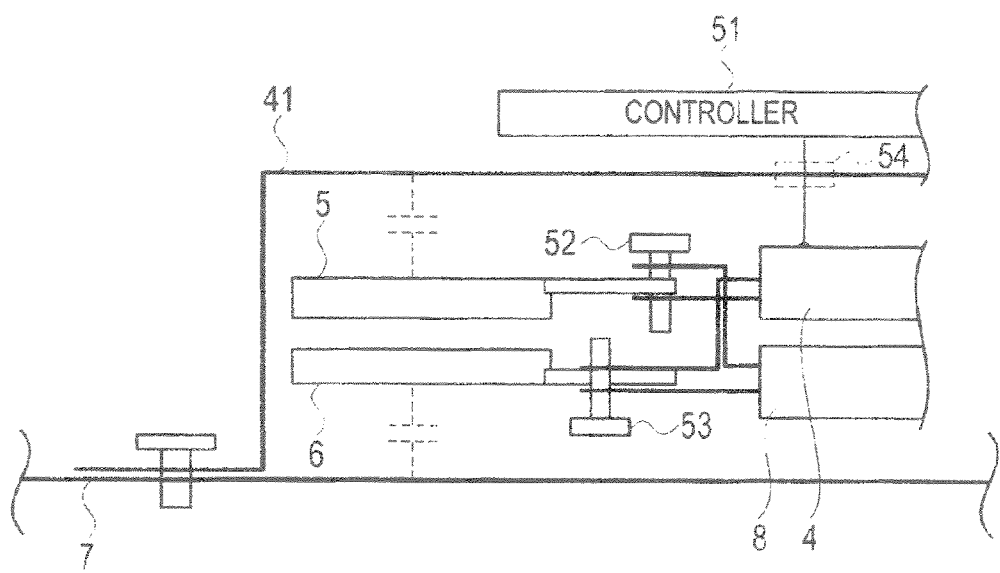
FIG. 15 is a view showing a cross-sectional structure of a power conversion device according to a fifth embodiment to which the present invention is applied.

FIG. 15 is a cross-sectional view for explaining the structure of a power conversion device according to this embodiment. As shown in FIG. 15, the power conversion device according to this embodiment has the following feature: the casing conducting member 41 is disposed between a controller 51 for controlling the power module 4 and both of the first and second power supply buses 5 and 6.

The controller 51 is a device for turning on or off switches inside the power module 4, and the casing conducting member 41 is disposed between the controller 51 and both of the first and second power supply buses 5 and 6. Accordingly, the influence of switching noise from the first and second power supply buses 5 and 6 can be reduced.

A method of connecting components will be described. First, the first power supply bus 5 is connected to positive sides of the power module 4 and the smoothing capacitor 8 with a screw 52. Next, the second power supply bus 6 is connected to negative sides of the power module 4 and the smoothing capacitor 8 with a screw 53. Then, the first and second power supply buses 5 and 6 are disposed between the metal casing 7 and the casing conducting member 41, and the controller 51 and the power module 4 are connected by providing a through-hole 54 in part of the casing conducting member 41.

[Effects of Fifth Embodiment]

As described above in detail, in the power conversion device according to this embodiment, the casing conducting member 41 is disposed between the controller 51 for controlling the power module 4 and both of the first and second power supply buses 5 and 6. Accordingly, the influence of switching noise from the first and second power supply buses 5 and 6 on the controller 51 can be reduced.

[Sixth Embodiment]

Next, a sixth embodiment to which the present invention is applied will be described with reference to drawings. It should be noted that the same portions as in the above-described first to fifth embodiments will not be further described in detail.

Figure 16:
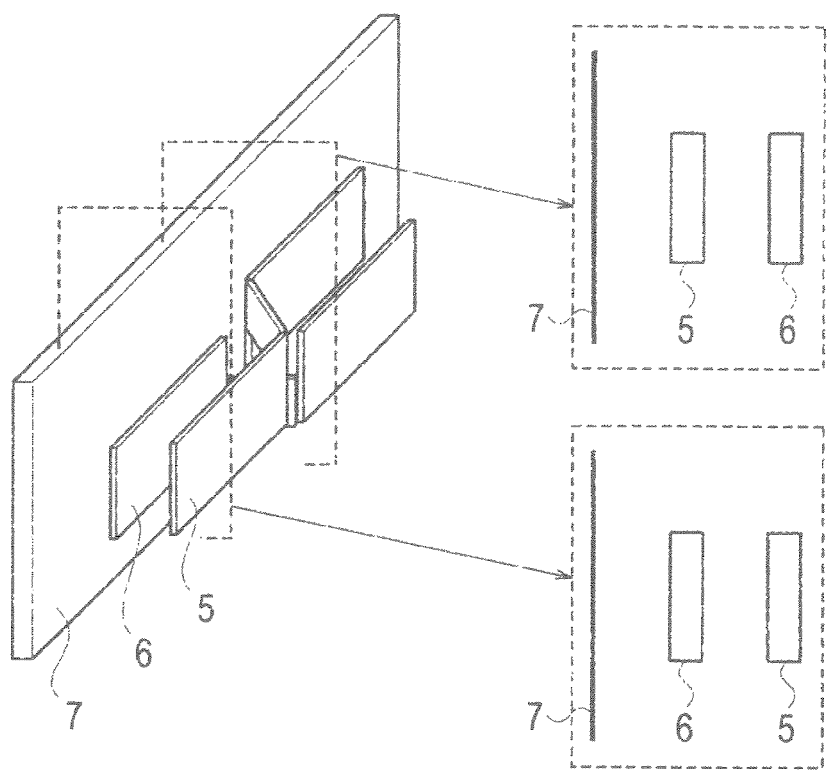
FIG. 16 is a perspective view for explaining the structure of a power conversion device according to a sixth embodiment to which the present invention is applied.

FIG. 16 is a view for explaining the structures of first and second power supply buses in a power conversion device according to this embodiment. As shown in FIG. 16, the power conversion device according to this embodiment has the following feature: the first power supply bus 5 and the second power supply bus 6 cross at an intermediate point, and are disposed at symmetric positions with respect to the metal casing 7. The first and second power supply buses 5 and 6 having the above-described structures are applied to the aforementioned first to fifth embodiments.

By disposing the first power supply bus 5 and the second power supply bus 6 such that the first power supply bus 5 and the second power supply bus 6 cross as described above, the frequency expressed by formula (1) can be shifted to a higher frequency. Accordingly, the propagation of switching noise generated in the first power supply bus 5 and the second power supply bus 6 by switching inside the power module 4 to the metal casing 7 can be reduced.

It should be noted that though there is only one crossing point in FIG. 16, there may be two or more crossing points. Moreover, though in FIG. 16 the first and second power supply buses 5 and 6 are disposed such that large-area flat surfaces thereof face the metal casing 7, the first and second power supply buses 5 and 6 may be disposed such that small-area flat surfaces thereof may face the metal casing 7 as shown in FIG. 4.

[Effects of Sixth Embodiment]

As described above in detail, in the power conversion device according to this embodiment, the first power supply bus 5 and the second power supply bus 6 cross at an intermediate point and are disposed at symmetric positions with respect to the metal casing 7. Accordingly, the capacitive coupling between the first power supply bus 5 and the metal casing 7 and the capacitive coupling between the second power supply bus 6 and the metal casing 7 can be easily substantially matched.

[Seventh Embodiment]

Next, a seventh embodiment to which the present invention is applied will be described with reference to drawings. It should be noted that the same portions as in the above-described first to sixth embodiments will not be further described in detail.

Figure 17:
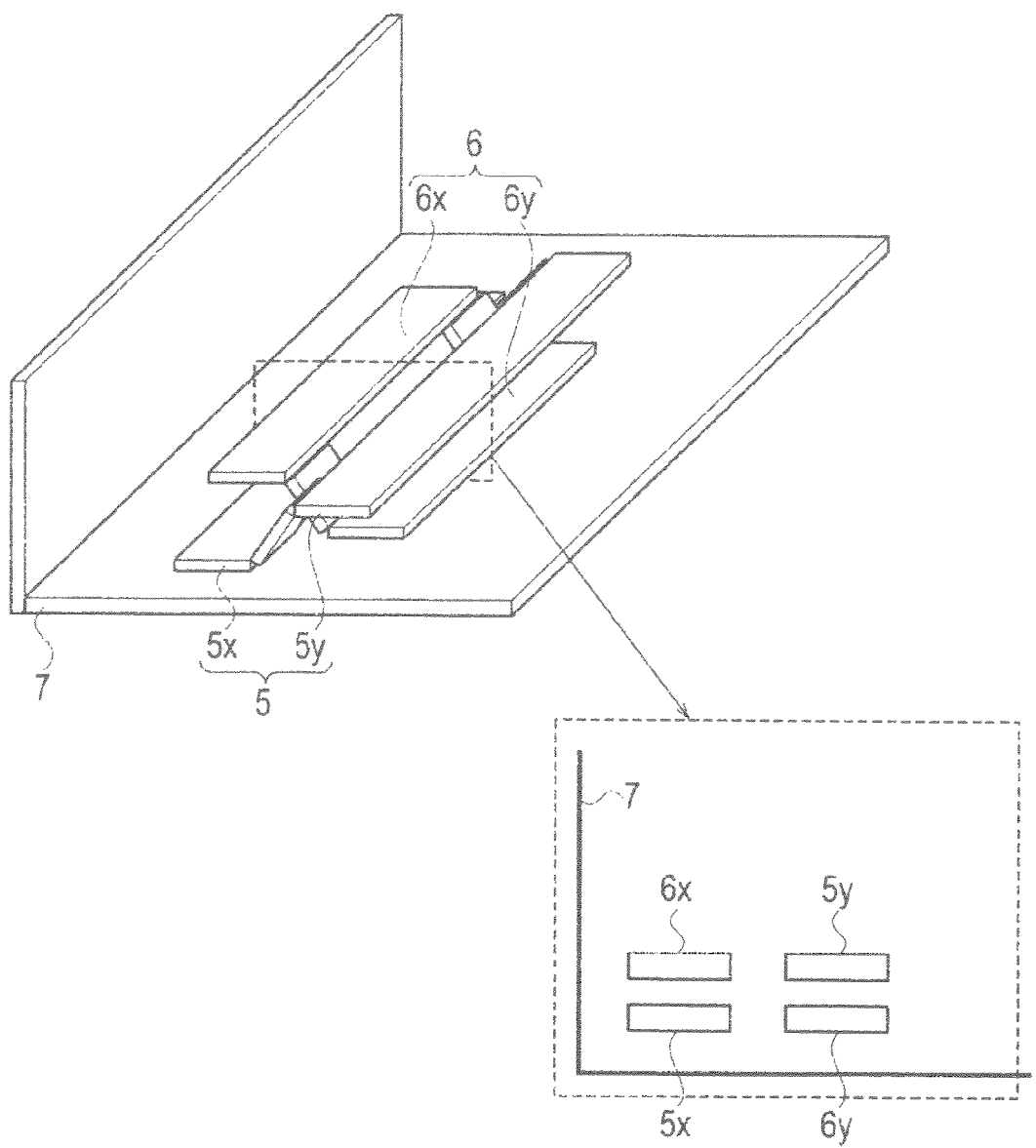
FIG. 17 is a perspective view for explaining the structure of a power conversion device according to a seventh embodiment to which the present invention is applied.

FIG. 17 is a view for explaining the structures of first and second power supply buses in a power conversion device according to this embodiment. As shown in FIG. 17, the power conversion device according to this embodiment has the following features: each of the first power supply bus 5 and the second power supply bus 6 includes plural plate-shaped electrically conductive members 5x and 5y, or 6x and 6y, and the plate-shaped electrically conductive members 5x, 5y, 6x, and 6y are disposed at symmetric positions with respect to the metal casing 7. The first and second power supply buses 5 and 6 having the above-described structures are applied to the aforementioned first to fifth embodiments.

By disposing the plate-shaped electrically conductive members 5x, 5y, 6x, and 6y at symmetric positions with respect to the metal casing 7 as described above, electric characteristics between the first power supply bus 5 and the metal casing 7 and electric characteristics between the second power supply bus 6 and the metal casing 7 can be easily substantially matched. This can reduce the propagation of switching noise generated in the first power supply bus 5 and the second power supply bus 6 by switching inside the power module 4 to the metal casing 7.

[Effects of Seventh Embodiment]

As described above in detail, in the power conversion device according to this embodiment, each of the first power supply bus 5 and the second power supply bus 6 includes plural plate-shaped electrically conductive members, and the plate-shaped electrically conductive members are disposed at symmetric positions with respect to the metal casing 7. Accordingly, the capacitive coupling between the first power supply bus 5 and the metal casing 7 and the capacitive coupling between the second power supply bus 6 and the metal casing 7 can be easily substantially matched.

[Eighth Embodiment]

Next, an eighth embodiment to which the present invention is applied will be described with reference to drawings. It should be noted that the same portions as in the above-described first to seventh embodiments will not be further described in detail.

Figure 18:
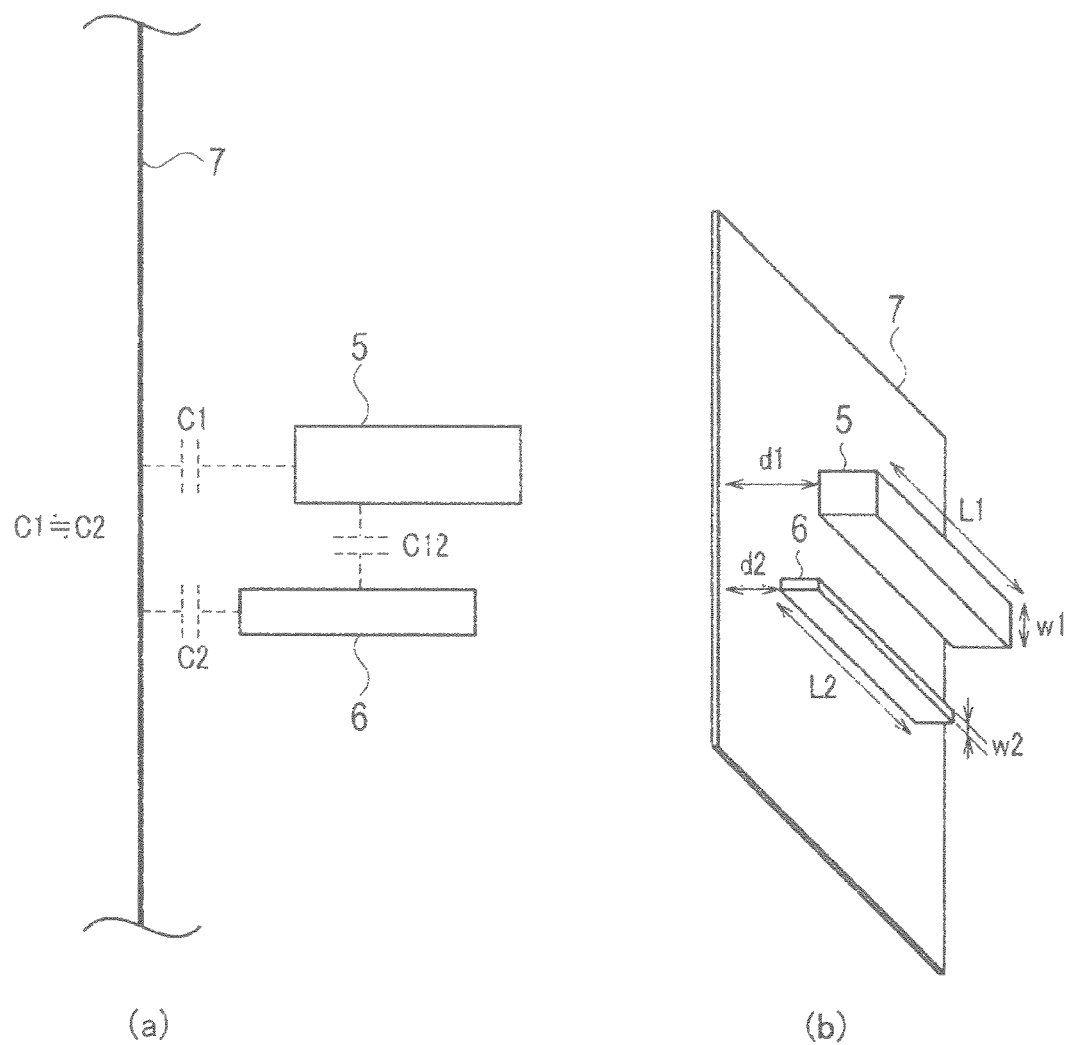
FIG. 18 contains a cross-sectional structure view and a three-dimensional perspective view of a power conversion device according to an eighth embodiment to which the present invention is applied.

FIG. 18 is a view showing a cross-sectional structure of the aforementioned portion indicated by A in FIG. 1. As shown in FIG. 18 (a), a power conversion device according to this embodiment has the following feature: the capacitive coupling C1 between the first power supply bus 5 and the metal casing 7 and the capacitive coupling C2 between the second power supply bus 6 and the metal casing 7 are matched or substantially matched by adjusting the relationship between the area of a surface of the first power supply bus 5 facing the metal casing 7 and the area of a surface of the second power supply bus 6 facing the metal casing 7.

Specifically, when the length and width of the first power supply bus 5 are denoted by L1 and w1 as shown in FIG. 18 (b), respectively, the area of the surface of the first power supply bus 5 facing the metal casing 7 S1 can be calculated by the following equation:

$$S1 = L1 \times w1.$$

Similarly, when the length and width of the second power supply bus 6 are denoted by L2 and w2, the area of the surface of the second power supply bus 6 facing the metal casing 7 S2 can be calculated by the following equation:

$$S2 = L2 \times w2.$$

Here, to match the capacitive coupling C1 between the first power supply bus 5 and the metal casing 7 and the capacitive coupling C2 between the second power supply bus 6 and the metal casing 7, the following relationship needs to be satisfied:

$$S1/d1 = S2/d2 \qquad (6)$$

where d1 is the distance between the first power supply bus 5 and the metal casing 7, and d2 is the distance between the second power supply bus 6 and the metal casing 7.

Accordingly, by presetting the distances d1 and d2 and adjusting the relationship between the area S1 of the surface of the first power supply bus 5 facing the metal casing 7 and the area S2 of the surface of the second power supply bus 6 facing the metal casing 7, the capacitive coupling C1 between the first power supply bus 5 and the metal casing 7 and the capacitive coupling C2 between the second power supply bus 6 and the metal casing 7 can be matched or substantially matched.

This can reduce the propagation of switching noise generated in the first power supply bus 5 and the second power supply bus 6 by switching inside the power module 4 to the metal casing 7.

Moreover, in formula (6), not only the areas S1 and S2 but also the relationship between the distance d1 between the first power supply bus 5 and the metal casing 7 and the distance d2 between the second power supply bus 6 and the metal casing 7 may be adjusted to match or substantially match the capacitive coupling C1 between the first power supply bus 5 and the metal casing 7 and the capacitive coupling C2 between the second power supply bus 6 and the metal casing 7. In other words, all of the areas S1 and S2 and the distances d1 and d2 may be adjusted to match or substantially match the capacitive coupling C1 and the capacitive coupling C2.

Further, in addition to the above-described areas S1 and S2 and distances d1 and d2, as shown in FIG. 8, the relationship between the dielectric constant between the first power supply bus 5 and the metal casing 7 and the dielectric constant between the second power supply bus 6 and the metal casing 7 may be adjusted to match or substantially match the capacitive coupling C1 between the first power supply bus 5 and the metal casing 7 and the capacitive coupling C2 between the second power supply bus 6 and the metal casing 7.

Specifically, as shown in FIG. 8, a dielectric 21 or a magnetic body 22 is disposed between the first power supply bus 5 and the metal casing 7 and/or between the second power supply bus 6 and the metal casing 7 to match or substantially match the capacitive coupling C1 between the first power supply bus 5 and the metal casing 7 and the capacitive coupling C2 between the second power supply bus 6 and the metal casing 7. In other words, all of the areas S1 and S2, the distances d1 and d2, and dielectric constants are adjusted to match or substantially match the capacitive coupling C1 and the capacitive coupling C2.

This can reduce the propagation of switching noise generated in the first power supply bus 5 and the second power supply bus 6 by switching inside the power module 4 to the metal casing 7.

Figure 19:
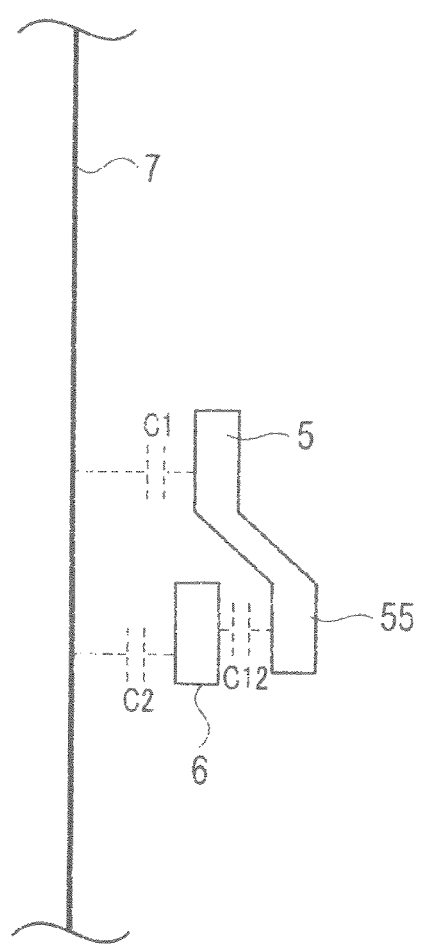
FIG. 19 is a view showing a cross-sectional structure of the power conversion device according to the eighth embodiment to which the present invention is applied.

Moreover, though the small-area flat surfaces of the first and second power supply buses 5 and 6 are faced to the metal casing 7 in FIG. 18, the large-area flat surfaces of the first and second power supply buses 5 and 6 may be faced to the metal casing 7 as shown in FIG. 19. However, such an arrangement reduces the area of a surface of the first power supply bus 5 which faces the second power supply bus 6. Accordingly, a plate-shaped electrically conductive member 55 is installed such that the large-area flat surface thereof faces the second power supply bus 6, and this plate-shaped electrically conductive member 55 is connected to the first power supply bus 5. This reduces the inductive coupling between the first power supply bus 5 and the second power supply bus 6, and can reduce switching noise generated in the first power supply bus 5 and the second power supply bus 6.

[Effects of Eighth Embodiment]

As described above in detail, in the power conversion device according to this embodiment, the capacitive coupling C1 between the first power supply bus 5 and the metal casing 7 and the capacitive coupling C2 between the second power supply bus 6 and the metal casing 7 are substantially matched. Accordingly, radiation noise can be reduced by reducing the propagation of switching noise to the metal casing 7.

Moreover, in the power conversion device according to this embodiment, the capacitive coupling C1 between the first power supply bus 5 and the metal casing 7 and the capacitive coupling C2 between the second power supply bus 6 and the metal casing 7 are substantially matched by adjusting the relationship between the area of the surface of the first power supply bus 5 facing the metal casing 7 and the area of the surface of the second power supply bus 6 facing the metal casing 7. Accordingly, radiation noise can be reduced by reducing the propagation of switching noise to the metal casing 7.

Further, in the power conversion device according to this embodiment, the capacitive coupling C1 between the first power supply bus 5 and the metal casing 7 and the capacitive coupling C2 between the second power supply bus 6 and the metal casing 7 are substantially matched by adjusting the relationship between the distance between the first power supply bus 5 and the metal casing 7 and the distance between the second power supply bus 6 and the metal casing 7, the relationship between the dielectric constant between the first power supply bus 5 and the metal casing 7 and the dielectric constant between the second power supply bus 6 and the metal casing 7, and the relationship between the area of the surface of the first power supply bus 5 facing the metal casing 7 and the area of the surface of the second power supply bus 6 facing the metal casing 7. Accordingly, radiation noise can be reduced by reducing the propagation of switching noise to the metal casing 7.

It should be noted that the above-described embodiments are examples of the present invention. Accordingly, the present invention is not limited to the above-described embodiments. It is a matter of course that various modifications other than the above-described embodiments can be made in accordance with design and the like without departing from the scope of technical ideas of the invention.

The present application claims the benefit of priority to Japanese Patent Application No. 2011-258589, filed on Nov. 28, 2011, the contents of which are incorporated herein by reference.

INDUSTRIAL APPLICABILITY

In a power conversion device according to one aspect of the present invention, the capacitive coupling C1 between the first power supply bus 5 and the metal casing 7 and the capacitive coupling C2 between the second power supply bus 6 and the metal casing 7 are substantially matched. Thus, radiation noise can be reduced by reducing the propagation of switching noise to the metal casing 7. Accordingly, the power conversion device according to one aspect of the present invention has industrial applicability.

REFERENCE SIGNS LIST 1 power conversion device
2 direct current power supply
3 electric motor
4, 4a to 4f power module
5, 5x, 5y first power supply bus
6, 6x, 6y second power supply bus
7 metal casing
8 smoothing capacitor
9 bus bar
10, 11 shielded cable
17, 43 resin
21 dielectric
22 magnetic body
31, 52, 53 screw
41 casing conducting member
42 fastening member
51 controller
54 through-hole

The invention claimed is:

1. A power conversion device for converting direct current electricity supplied from a direct current power supply to alternating current electricity, the power conversion device comprising:
 a first input terminal connected to a positive electrode of the direct current power supply;
 a second input terminal connected to a negative electrode of the direct current power supply;
 a power module for converting the direct current electricity supplied from the direct current power supply to the alternating current electricity;
 a first power supply bus connecting the first input terminal and the power module;
 a second power supply bus connecting the second input terminal and the power module;
 a metal casing for housing the first and second power supply buses and the power module; and
 a casing conducting member electrically continuous with the metal casing,
 wherein a capacitive coupling between the first power supply bus and the casing conducting member and a capacitive coupling between the second power supply bus and the metal casing are substantially matched, and the first power supply bus and the second power supply bus are disposed between the casing conducting member and the metal casing.

2. The power conversion device according to claim 1, wherein the capacitive coupling between the first power supply bus and the casing conducting member and the capacitive coupling between the second power supply bus and the metal casing are substantially matched by adjusting a relationship between a distance between the first power supply bus and the casing conducting member and a distance between the second power supply bus and the metal casing.

3. The power conversion device according to claim 1, wherein the capacitive coupling between the first power supply bus and the casing conducting member and the capacitive coupling between the second power supply bus and the metal casing are substantially matched by adjusting a relationship between a dielectric constant between the first power supply bus and casing conducting member and a dielectric constant between the second power supply bus and the metal casing.

4. The power conversion device according to claim 3, wherein the relationship between the dielectric constant between the first power supply bus and the casing conducting member and the dielectric constant between the second power supply bus and the metal casing is adjusted by disposing a dielectric or a magnetic body between the first power supply bus and the casing conducting member and/or between the second power supply bus and the metal casing.

5. The power conversion device according to claim 1, wherein the capacitive coupling between the first power supply bus and the casing conducing member and the capacitive coupling between the second power supply bus and the metal casing are substantially matched by adjusting a relationship between an area of a surface of the first power supply bus facing the casing conducting member and an area of a surface of the second power supply bus facing the metal casing.

6. The power conversion device according to claim 1, wherein the capacitive coupling between the first power supply bus and the casing conducting member and the capacitive coupling between the second power supply bus and the metal casing are substantially matched by adjusting:
   a relationship between a distance between the first power supply bus and the casing conducting member and a distance between the second power supply bus and the metal casing;
   a relationship between a dielectric constant between the first power supply bus and the casing conducting member and dielectric constant between the second power supply bus and the metal casing; and
   a relationship between an area of a surface of the first power supply bus facing the casing conducting member and an area of a surface of the second power supply bus facing the metal casing.

7. The power conversion device according to claim 1, wherein each of the first power supply bus and the second power supply bus is formed of a plate-shaped electrically conductive member, and the first power supply bus and the second power supply bus are disposed such that large-area flat surfaces thereof face each other.

8. The power conversion device according to claim 1, wherein the first power supply bus and the second power supply bus are molded with resin.

9. The power conversion device according to claim 1, wherein the casing conducting member is disposed between a controller for controlling the power module and both of the first and second power supply buses.

10. The power conversion device according to claim 1, wherein the first power supply bus and the second power supply bus cross at an intermediate point, and are disposed at symmetric positions with respect to the metal casing.

11. The power conversion device according to claim 1, wherein each of the first power supply bus and the second power supply bus comprises a plurality of plate-shaped electrically conductive members, and the plate-shaped electrically conductive members are disposed at symmetric positions with respect to the metal casing.

12. The power conversion device according to claim 1, wherein a capacitive coupling quotient obtained by dividing a difference between the capacitive coupling between the first power supply bus and the casing conducting member and the capacitive coupling between the second power supply bus and the metal casing by a sum of the capacitive coupling between the first power supply bus and the casing conducting member and the capacitive coupling between the second power supply bus and the metal casing is 2 or less.

13. The power conversion device according to claim 1, wherein an inductive coupling quotient obtained by dividing a difference between an inductive coupling between the first power supply bus and the casing conducting member and an inductive coupling between the second power supply bus and the metal casing by a sum of the inductive coupling between the first power supply bus and the casing conducting member and the inductive coupling between the second power supply bus and the metal casing is 2 or less.

14. The power conversion device according to claim 13, wherein a product of a capacitive coupling quotient and the inductive coupling quotient is 2 or less.

15. The power conversion device according to claim 1,
wherein a capacitive coupling quotient obtained by dividing a difference between the capacitive coupling between the first power supply bus and the casing conducting member and the capacitive coupling between the second power supply bus and the metal casing by a sum of the capacitive coupling between the first power supply bus and the casing conducting member and the capacitive coupling between the second power supply bus and the metal casing is 2 or less,
wherein an inductive coupling quotient obtained by dividing a difference between an inductive coupling between the first power supply bus and the casing conducting member and an inductive coupling between the second power supply bus and the metal casing by a sum of the inductive coupling between the first power supply bus and the casing conducting member and the inductive coupling between the second power supply bus and the metal casing is 2 or less, and
wherein a product of the capacitive coupling quotient and the inductive coupling quotient is 2 or less.

16. The power conversion device according to claim 1,
wherein a capacitive coupling quotient is obtained by dividing a difference between the capacitive coupling between the first power supply bus and the casing conducting member and the capacitive coupling between the second power supply bus and the metal casing by a sum of the capacitive coupling between the first power supply bus and the casing conducting member and the capacitive coupling between the second power supply bus and the metal casing,
wherein an inductive coupling quotient is obtained by dividing a difference between an inductive coupling between the first power supply bus and the casing conducting member and an inductive coupling between the second power supply bus and the metal casing by a sum of the inductive coupling between the first power supply bus and the casing conducting member and the inductive coupling between the second power supply bus and the metal casing, and
wherein a product of the capacitive coupling quotient and the inductive coupling quotient is 2 or less.

17. A power conversion device for converting direct current electricity supplied from a direct current power supply to alternating current electricity, the power conversion device comprising:
   a first input terminal connected to a positive electrode of the direct current power supply;
   a second input terminal connected to a negative electrode of the direct current power supply;
   a power conversion means for converting the direct current electricity supplied from the direct current power supply to the alternating current electricity;
   a first power supply means connecting the first input terminal and the power conversion means;
   a second power supply means connecting the second input terminal and the power conversion means;
   a metal housing means for housing the first and second power supply means and the power conversion means; and
   a casing conducting member electrically continuous with the metal housing means,
   wherein a capacitive coupling between the first power supply means and the casing conducting member and a capacitive coupling between the second power supply means and the metal housing means are substantially matched, and the first power supply means and the second power supply means are disposed between the casing conducting member and the metal housing means.

\* \* \* \* \*